April 19, 1960        H. W. SHUMAKER        2,933,344
WIND DEFLECTORS
Filed July 14, 1958
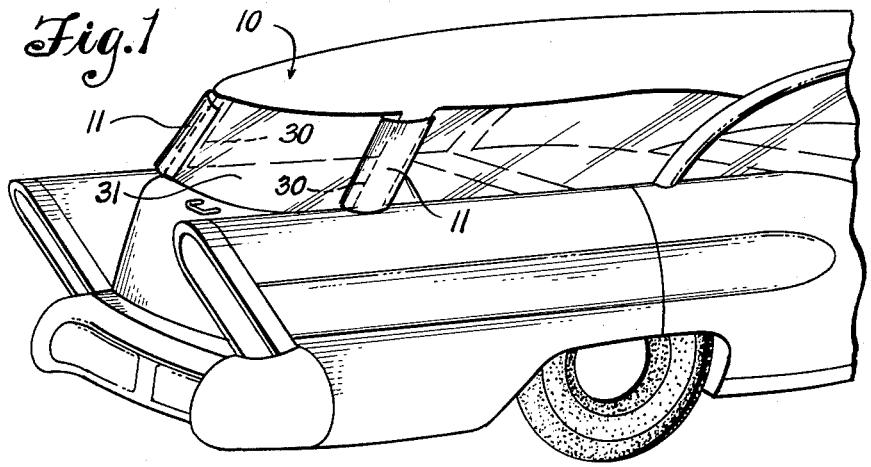
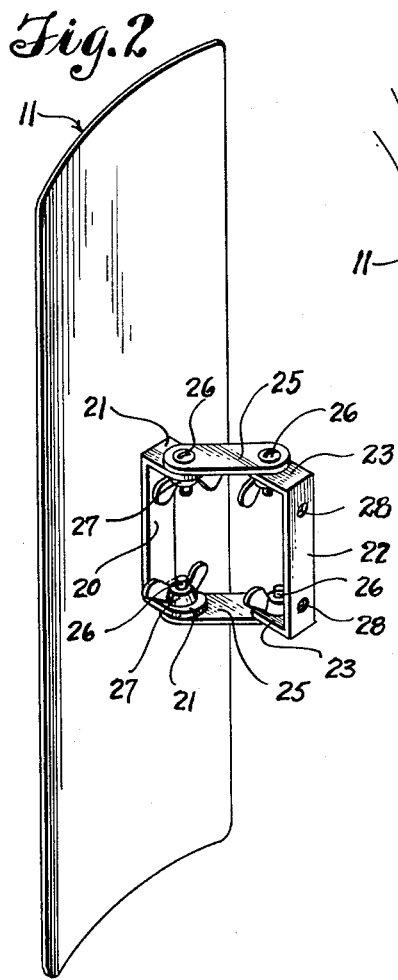
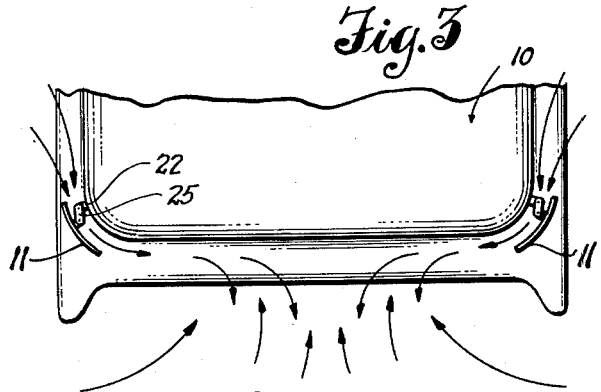
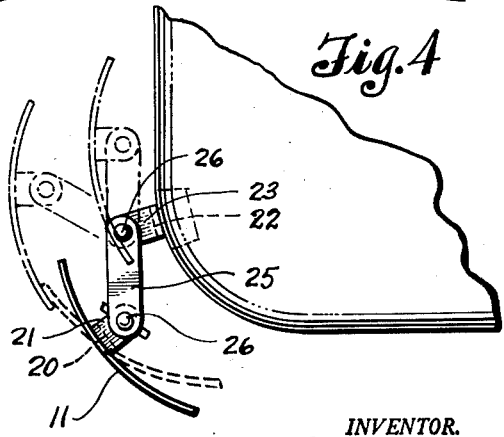
INVENTOR.
HUGH W. SHUMAKER
BY
Robinson & Berry
ATTORNEYS

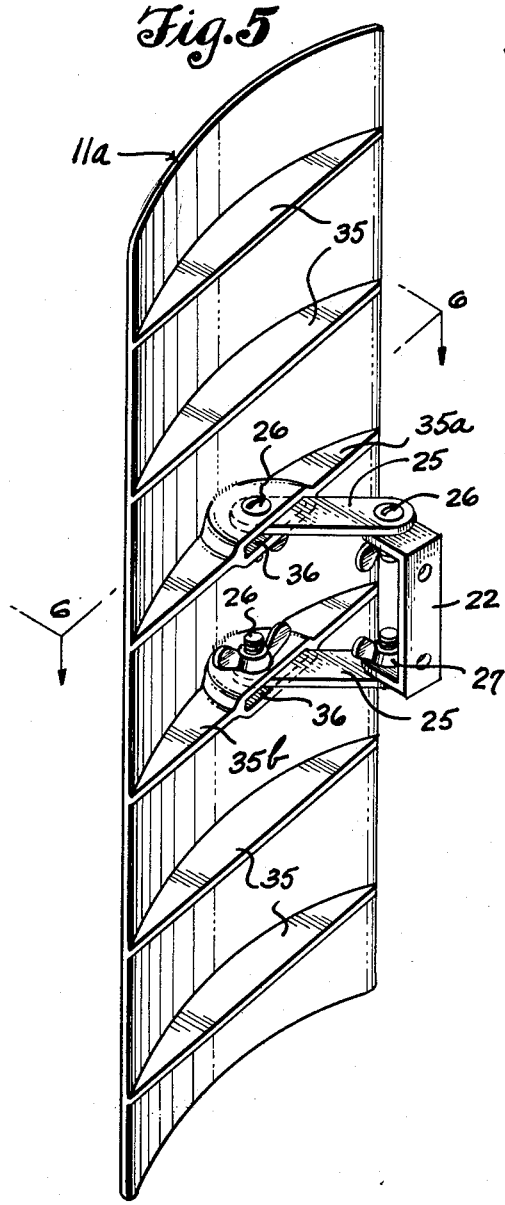
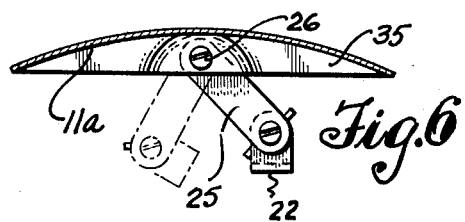
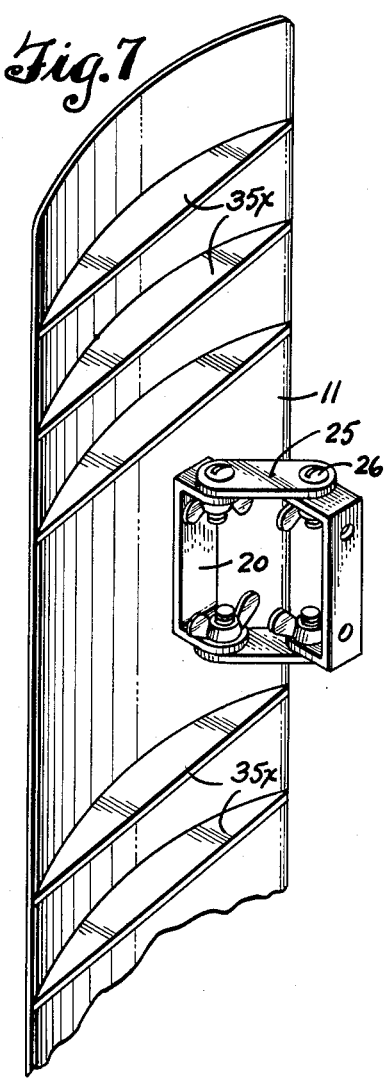

United States Patent Office 2,933,344
Patented Apr. 19, 1960

2,933,344

WIND DEFLECTORS

Hugh W. Shumaker, Moscow, Idaho

Application July 14, 1958, Serial No. 748,336

4 Claims. (Cl. 296—91)

This invention relates to wind deflectors as used on automobiles, and it has reference more particularly to their use for deflecting air currents across the rear end window of the automotive vehicle to which they are attached.

It is the principal object of this invention to provide automotive vehicles, particularly those of the station wagon types but not limited thereto, with wind deflectors whereby air currents or wind induced or augmented by the forward travel of the vehicle along a road or highway, will be deflected from opposite sides of the vehicle across the rear end window as a means of keeping the glass free of dust and road dirt that is usually sucked into that space immediately back of the vehicle as it travels forwardly.

More specifically stated, it is the object of this invention to provide wind deflectors of a novel form or desgin, together with means for their adjustable attachment to the vehicle at opposite sides of its rear end portion, whereby air currents will be diverted from opposite sides of the forwardly traveling vehicle into that space immediately back of the rear end window thus to eliminate the vacuum that is there created by the fast forward travel of the vehicle, and by so doing, to eliminate the great extent the suction that causes dust and road dirt to be sucked up and caused to be delivered against the rear window glass.

Another object of the invention is to provide deflectors of the kind and for the purpose above stated that are of novel form, and which are equipped with supporting brackets of adjustable kind which permits the deflectors to be used in either of two ways, as may best suit the shape or character of the vehicle rear end structure, and also which permits them to be adjusted to suit the curvature of the automobile body where sidewalls join with the rear end wall, and as necessary to obtain more or less deflection of air currents into the vacuum space.

Still further objects and advantages of the invention reside in the details of construction and combination of parts embodied by the invention and in their mode of use, as will hereinafter be fully described.

In accomplishing the above mentioned and other objects of the invention, I have provided the improved detail of construction, the preferred forms of which are illustrated in the accompanying drawings, wherein:

Fig. 1 is a view showing wind deflectors embodied by the present invention as applied to an automobile of station wagon type.

Fig. 2 is a perspective view of one of the present deflectors; showing its inner face and also showing the bracket by which it may be fixed to the automobile body in accordance with the teaching of this invention.

Fig. 3 is a diagram illustrating the lateral deflection of air currents by the deflectors as applied to the vehicle, and the way in which these air currents counteract the air currents drawn into the vacuum space back of the forwardly traveling vehicle.

Fig. 4 is an enlarged detail illustrating the adjustability of the deflector afforded by use of the present supporting bracket.

Fig. 5 is a perspective view showing an alternate form of molded deflector.

Fig. 6 is a cross-section taken on line 6—6 in Fig. 5.

Fig. 7 is a view showing the metal deflector plate of Fig. 2 as equipped with wind guiding fins.

Referring more in detail to the drawings.

In Fig. 1, 10 designates what may be the rear end portion of the body of a typical automotive vehicle of the station wagon style or type, to which wind deflectors embodied by the present invention have been applied; the deflectors being herein designated by reference numerals 11—11. These deflectors, are alike except as made for "right side" and "left side" use.

Referring more particularly to the deflector of Fig. 2: It is to be noted therein that the deflector body comprises a single piece of rigid sheet metal, preferably polished or plated. The piece of sheet material comprising each deflector body is transversely curved as noted in Fig. 4. Its opposite longitudinal edges are here shown to be parallel and its opposite end edges which also are parallel, are angularly inclined at an angle of approximately 10° relative to the longitudinal edges.

Each plate 11 is equipped with a bracket for its adjustable mounting on the vehicle. Each bracket comprises, at its outer end, a metal strap 20 that is spot welded to the inside face of the plate 11 midway of its upper and lower end and extending lengthwise thereof. Opposite end portions of this strap are turned at right angles away the inner face of the plate, thus providing paired ear portions 21—21.

At its inner end, each bracket comprises a mounting strap 22, like that which is attached to the deflector body; being of the same length and having its opposite end portions turned at right angles thereto, in the same direction, thus to provide paired ears 23—23. Extending between the end ears 21 and 23 of the two straps 20 and 22 are paired connecting links 25—25, each of which links overlap the ears 21 and 23 and is pivoted thereto by means of short bolts 26 passed through the parts and to which wing nuts 27 are applied. The ears and links are bored to receive the pivot bolts and, as shown in Fig. 2, the strap 22 is bored, as at 28, to receive screws for attaching the brackets to the vehicle body.

It is a feature of this invention that the straps 20, as spot welded to the body plates 11—11 are set closer to one edge of the plates than the other in order that, by inversion of the plate, it may be made to extend to a greater or lesser extent inwardly across the back side of the vehicle.

To mount the present wind deflectors, the inner end members of the brackets are fixed at selected positions on the opposite corner stiles 30—30 of the vehicle at opposite sides of the rear end window 31, as has been indicated in Fig. 2. In so mounting the brackets, the straps 22 are fixed flatly against the stile surfaces by suitable screws passed through the holes 28. The plates 11 are extended in a direction parallel with the direction of the stiles. The links 25—25 are then applied to the paired ears of the two straps to support the deflector plates in proper position. The plates are then adjusted in position to best suit the contour of the corner structure or to best suit the vehicle user. The deflector plates may be placed with the short flange, as measured from bracket strap 20 to the adjacent longitudinal edge of the plate, extended forwardly, thus to cause the rear edge of the plate to extend farther around the corner or by end for end reversal of the plate, the long flange can be extended forwardly to scoop up more air. The best air deflecting results are determined by trial, and may vary with use of the deflectors on vehicles of different makes. Adjustment in angular position of the plates, as well as their distances from the vehicle body or toward the rear or forwardly may be quickly made by loosening the wing nuts and then tightening them after adjustment has been made, thus to secure it.

The deflector plate 11a shown in Fig. 5 represents one that is molded of plastic. It is formed transversely across its inside, that is, across the side by which wind currents are deflected with a plurality of parallel and horizontally directed wind guiding fins 35. As here shown there are three fins above and three below the middle point of the plate. The two fins that are immediately above and below the middle of the plate, herein designated by reference numerals 35a and 35b, are formed with longitudinally directed slot like pockets 36; these open to the edges of the fins and are designed to contain the outer end portions of the paired links 25—25 therein for the adjustable mounting of the deflector plate on the vehicle. These fins are bored to receive the mounting screws 26 therethrough as shown. Wing nuts 27 are applied to the first bolts to secure any adjustment in the same manner as provided for in the device of Fig. 2. The fins 35 applied in this way keep the wind currents from being diverted downwardly and operate to maintain their direction across the window 31 when applied to the vehicle as in Fig. 1.

The showing in Fig. 7 illustrates the application of such fins to the metal deflector plate 11 of Fig. 2. They are designated in this view by numeral 35x.

Such fins may be applied in various numbers to the deflector plates, and may be angled to any extent necessary or as desired to best serve their purpose.

Deflectors of this kind may be applied to sedan and other types of automobiles, as well as to station wagons. They serve well to reduce or eliminate the usual vacuum that is created at the rear of the vehicle as it travels forward and by so doing they eliminate the suction that causes dust and road dirt to be drawn up and delivered against the rear window. In this way the need for the very frequent cleaning of the rear window is eliminated and rear vision therethrough is made clearer.

What I claim is:

1. In combination with a vehicle of the type having a closed body and being provided with a rear section which is substantially flat and generally vertical and having in the upper region thereof a generally upright and substantially flat window extending between rear corner posts of the vehicle body, whereby the vehicle while in motion tends to produce a vacuum in the region of the rear section thereof such as to cause dust and road dirt to be delivered against the rear window glass, a wind deflector disposed in outwardly spaced relationship with respect to each such corner post, each deflector being of a vertical height substantially the same as the vertical height of the rear window, means secured to each corner post articulately mounting a respective wind deflector therefrom, said means including a link extending between a respective corner post and deflector and being pivotally secured at its opposite ends to these members whereby each deflector is positionable to project laterally and forwardly from the rear window into the slip stream of air at its corresponding side of the vehicle body, each deflector being in the form of an elongate strip of material of generally rectangular form and being arcuated in cross section so that whereas the forward edge of each such deflector is disposed within the slip stream, the rear edge thereof is positioned to direct deflected air streams across the back surface of the window to obviate the vacuum effect of the vehicle body.

2. The assembly as defined in and by claim 1 wherein said means also includes a first strap member fixed to a respective deflector and having a pair of outstanding ears rigid therewith and disposed in vertically spaced relationship to each other, a second strap member fixed to a respective corner post and having a pair of outstanding ears rigid therewith disposed in vertically spaced relationship, said link being pivotally attached at its opposite ends to one ear of each said pair of ears, and there being a second link pivotally connected at its opposite ends to the other ears of said pairs of ears.

3. The combination as in claim 1 wherein said wind deflector is made of plastic and includes a plurality of transversely extending fins intermediate the ends thereof.

4. The combination as in claim 3 wherein said link is connected directly to one of said fins.

References Cited in the file of this patent

UNITED STATES PATENTS

| 1,364,053 | Quintin | Dec. 28, 1920 |
| 1,517,365 | Kleine | Dec. 2, 1924 |
| 1,543,877 | Saunders | June 30, 1925 |
| 1,584,275 | Chalkley | May 11, 1926 |
| 1,871,396 | Stalker | Aug. 9, 1932 |
| 2,199,883 | Ishiwata | May 7, 1940 |
| 2,547,528 | Lewis | Apr. 3, 1951 |

FOREIGN PATENTS

| 471,342 | Great Britain | Sept. 2, 1937 |
| 508,923 | Italy | Jan. 12, 1955 |